(12) United States Patent
Hata

(10) Patent No.: US 12,047,678 B2
(45) Date of Patent: Jul. 23, 2024

(54) IMAGE PICKUP SYSTEM THAT PERFORMS AUTOMATIC SHOOTING USING MULTIPLE IMAGE PICKUP APPARATUSES, IMAGE PICKUP APPARATUS, CONTROL METHOD THEREFOR, AND STORAGE MEDIUM

(71) Applicant: CANON KABUSHIKI KAISHA, Tokyo (JP)

(72) Inventor: Tetsuya Hata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/060,604

(22) Filed: Dec. 1, 2022

(65) Prior Publication Data

US 2023/0209187 A1 Jun. 29, 2023

(30) Foreign Application Priority Data

Dec. 28, 2021 (JP) ................. 2021-214657

(51) Int. Cl.
*H04N 23/667* (2023.01)
*H04N 23/61* (2023.01)
*H04N 23/73* (2023.01)
*H04N 23/74* (2023.01)

(52) U.S. Cl.
CPC ........... *H04N 23/667* (2023.01); *H04N 23/61* (2023.01); *H04N 23/73* (2023.01); *H04N 23/74* (2023.01)

(58) Field of Classification Search
CPC ...... H04N 23/667; H04N 23/61; H04N 23/73; H04N 23/74; H04N 23/90; H04N 23/661; H04N 23/71; H04N 23/72
See application file for complete search history.

(56) References Cited

U.S. PATENT DOCUMENTS 9,124,729 B2 * 9/2015 Jung ................... H04N 23/661
9,998,648 B2 * 6/2018 Ito .......................... G08C 17/02

FOREIGN PATENT DOCUMENTS

JP 2016-039622 A 3/2016

* cited by examiner

*Primary Examiner* — Twyler L Haskins
*Assistant Examiner* — Angel L Garces-Rivera
(74) *Attorney, Agent, or Firm* — Venable LLP

(57) ABSTRACT

An image pickup system which is capable of properly reflecting a user's shooting intent on shooting parameters of multiple image pickup apparatuses. A first image pickup apparatus receives a change in shooting parameter and calculates a first feature value which is a feature value of a shooting scene in a picked-up image obtained by itself using the changed shooting parameter. On receiving a notification of the first feature value and the amount of the change in shooting parameter from the first image pickup apparatus, a second image pickup apparatus obtains a second feature value which is a feature value of a shooting scene in a picked-up image obtained by itself. Based on a result of comparison between the first feature value and the second feature value and the amount of the change in shooting parameter, the second image pickup apparatus changes a shooting parameter for itself.

22 Claims, 5 Drawing Sheets

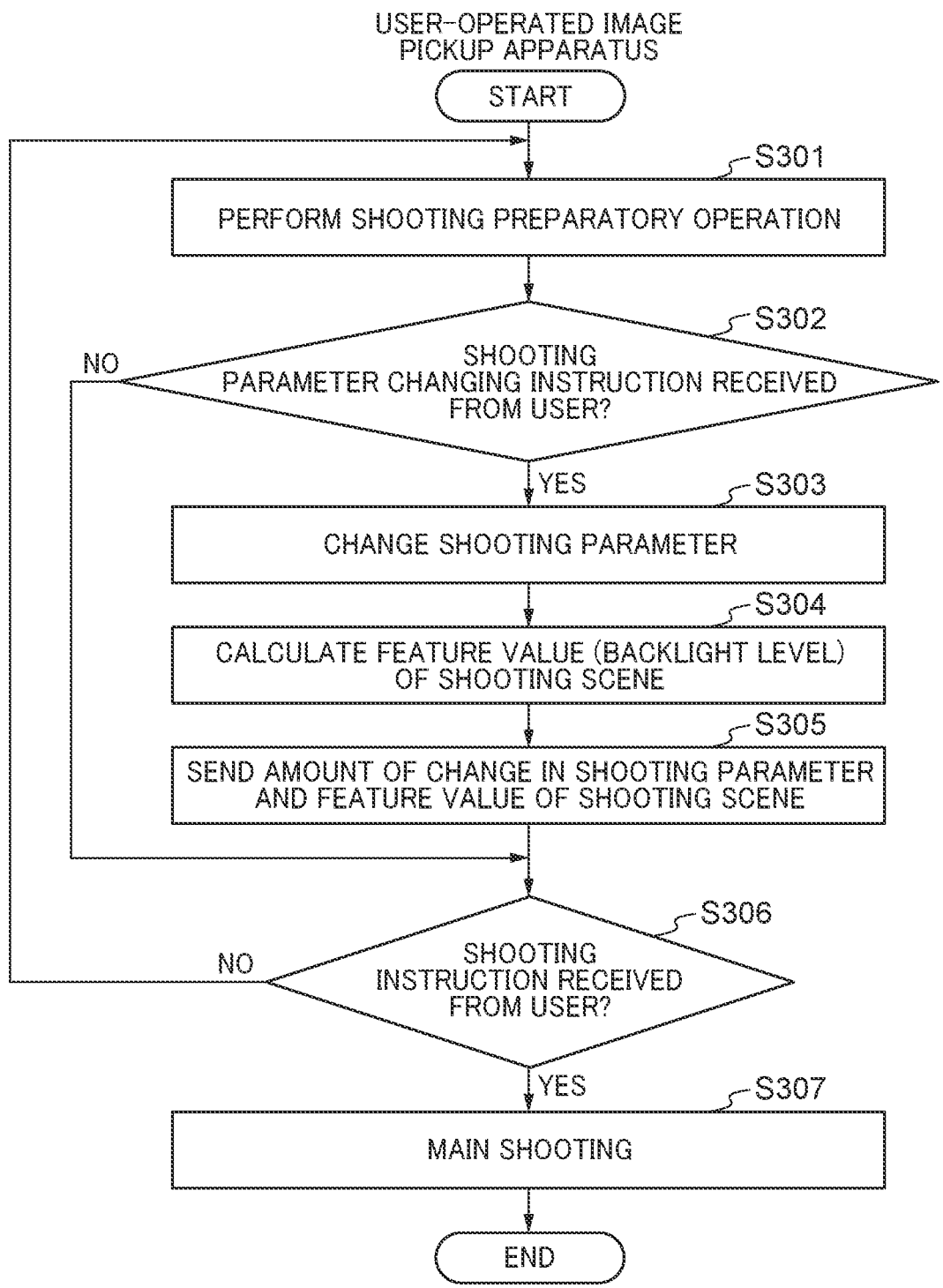

IMAGE PICKUP SYSTEM THAT PERFORMS AUTOMATIC SHOOTING USING MULTIPLE IMAGE PICKUP APPARATUSES, IMAGE PICKUP APPARATUS, CONTROL METHOD THEREFOR, AND STORAGE MEDIUM

BACKGROUND OF THE INVENTION

Field of the Invention

The present invention relates to an image pickup system, an image pickup apparatus, a control method therefor, and a storage medium.

Description of the Related Art

Image pickup systems capable synchronizing multiple image pickup apparatuses to shoot images are known. To shoot images matching a user's shooting intent in such an image pickup system, it is important to set shooting parameters for all the image pickup apparatuses in accordance with the user's shooting intent. Japanese Laid-Open Patent Publication (Kokai) No. 2016-39622 discloses a control apparatus capable of determining shooting parameters for a plurality of image pickup apparatuses in conjunction with one another.

According to the technique described in Japanese Laid-Open Patent Publication (Kokai) No. 2016-39622, in a case where a parent image pickup apparatus and children image pickup apparatuses differ in, for example, the angle of view and/or a subject to be shot, it may cause a difference in shooting conditions such as subject brightness between the parent image pickup apparatus and the children image pickup apparatuses or between the children image pickup apparatuses, which results in inappropriate values of shooting parameters set for the children image pickup apparatuses.

SUMMARY OF THE INVENTION

The present invention provides an image pickup system, which is capable of properly reflecting a user's shooting intent on shooting parameters for image pickup apparatuses, an image pickup apparatus, a control method therefor, and a storage medium.

According to an aspect of the invention, an image pickup system includes a first image pickup apparatus and at least one second image pickup apparatus that is communicably connected to the first image pickup apparatus to perform automatic shooting. The first image pickup apparatus includes a first image pickup unit that outputs a picked-up image obtained by capturing an image of a subject, a first communication unit that communicates with the at least one second image pickup apparatus, at least one processor, and a memory including instructions that, when executed by the at least one processor, causes the at least one processor to perform the following operations. The instructions cause the at least one processor of the first image pickup apparatus to receive a change in shooting parameter set for the first image pickup apparatus, and calculate a first feature value, which is a feature value of a shooting scene in a picked-up image obtained by the first image pickup unit using the shooting parameter changed. The instructions further cause the at least one processor to notify the at least one second image pickup apparatus of the first feature value and an amount of the change in shooting parameter for the first image pickup apparatus via the first communication unit. The at least one second image pickup apparatus each includes a second image pickup unit that outputs a picked-up image obtained by capturing an image of a subject, a second communication unit that communicates with the first image pickup apparatus, at least one processor, and a memory including instructions that, when executed by the at least one processor, causes the at least one processor to perform the following operations. The instructions cause the at least one processor of the second image pickup apparatus to receive a notification of the first feature value and the amount of the change in shooting parameter for the first image pickup apparatus from the first image pickup apparatus via the second communication unit, to calculate a second feature value, which is a feature value of a shooting scene in a picked-up image obtained by the second image pickup unit. The instructions further cause the at least one processor to, based on a result of comparison between the first feature value and the second feature value and the amount of the change in shooting parameter for the first image pickup apparatus, change a shooting parameter for the second image pickup apparatus.

According to another aspect of the invention, a control method is provided for an image pickup system that includes a first image pickup apparatus and at least one second image pickup apparatus that is communicably connected to the first image pickup apparatus to perform automatic shooting. The control method includes receiving by the first image pickup apparatus a change in shooting parameter set for the first image pickup apparatus; and obtaining by the first image pickup apparatus a first feature value, which is a feature value of a shooting scene in a picked-up image obtained by a first image pickup unit of the first image pickup apparatus using the shooting parameter changed. The control method further includes notifying by the first image pickup apparatus the at least one second image pickup apparatus of the first feature value and an amount of the change in shooting parameter for the first image pickup apparatus; and upon the at least one second image pickup apparatus receiving a notification of the first feature value and the amount of the change in shooting parameter for the first image pickup apparatus from the first image pickup apparatus, obtaining by the at least one second image pickup apparatus a second feature value, which is a feature value of a shooting scene in a picked-up image obtained by an image pickup unit of the at least one second image pickup apparatus. The control method further includes, based on a result of comparison between the first feature value and the second feature value and the amount of the change in shooting parameter for the first image pickup apparatus, changing by the at least one second image pickup apparatus a shooting parameter for the at least one second image pickup apparatus.

According to another aspect of the invention, an image pickup apparatus includes an image pickup unit that outputs a picked-up image obtained by capturing an image of a subject, a communication unit that communicates with another image pickup apparatus, at least one processor, and a memory including instructions that, when executed by the at least one processor, causes the at least one processor to perform the following operations. The instructions cause the at least one processor to detect a first feature value of a picked-up image obtained by the image pickup unit, and receive a second feature value of a picked-up image obtained by an image pickup unit of the another image pickup apparatus from the another image pickup apparatus via the communication unit. The instructions further cause the at least one processor to, based on the first feature value and the second feature value, change a shooting parameter for the image pickup apparatus.

According to another aspect of the invention, a control method is provided for an image pickup apparatus that includes an image pickup unit that outputs a picked-up image obtained by capturing an image of a subject, and a communication unit that communicates with another image pickup apparatus. The control method includes detecting a first feature value of a picked-up image obtained by the image pickup unit; receiving a second feature value of a picked-up image obtained by an image pickup unit of the another image pickup apparatus from the another image pickup apparatus via the communication unit; and based on the first feature value and the second feature value, changing a shooting parameter for the image pickup apparatus.

According to the present invention, in the image pickup system that performs automatic shooting using a plurality of image pickup apparatuses, a user's shooting intent can be properly reflected on shooting parameters for the image pickup apparatuses.

Further features of the present invention will become apparent from the following description of exemplary embodiments with reference to the attached drawings.

BRIEF DESCRIPTION OF THE DRAWINGS

FIGS. 3A and 3B are flowcharts useful in explaining how a user-operated image pickup apparatus and automatic image pickup apparatuses according to the first embodiment operate in the image pickup system.

DESCRIPTION OF THE EMBODIMENTS

The present invention will now be described in detail below with reference to the accompanying drawings showing embodiments thereof.

First Embodiment

A description will now be given of an image pickup system according to a first embodiment in which an image pickup apparatus operated by a user and image pickup apparatuses performing automatic shooting calculate respective feature values of a shooting scene based on respective picked-up images and then perform automatic shooting based on the respective feature values obtained.

Figure 1A:
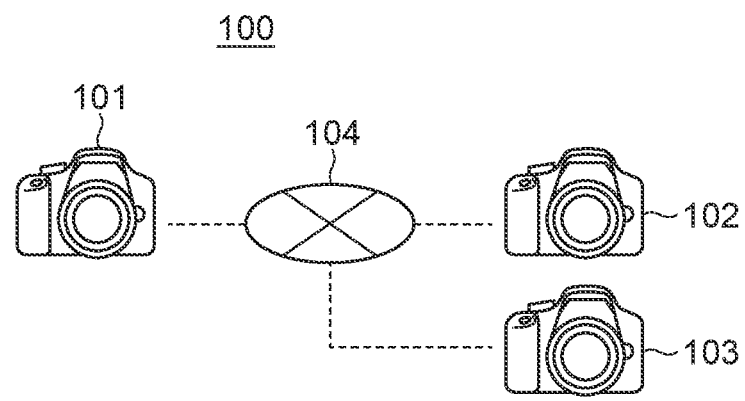
FIGS. 1A and 1B are views schematically illustrating a configuration of an image pickup system and an example of an arrangement of image pickup apparatuses, respectively, according to a first embodiment.

FIG. 1A is a view schematically illustrating a configuration of the image pickup system 100. In the image pickup system 100, a user-operated image pickup apparatus 101 (first image pickup apparatus), which performs shooting in response to user operations, and automatic image pickup apparatuses 102 and 103 (second image pickup apparatuses), which automatically perform shooting, are connected with one another via a communication network 104 such that they are able to communicate with each other.

Figure 1B:
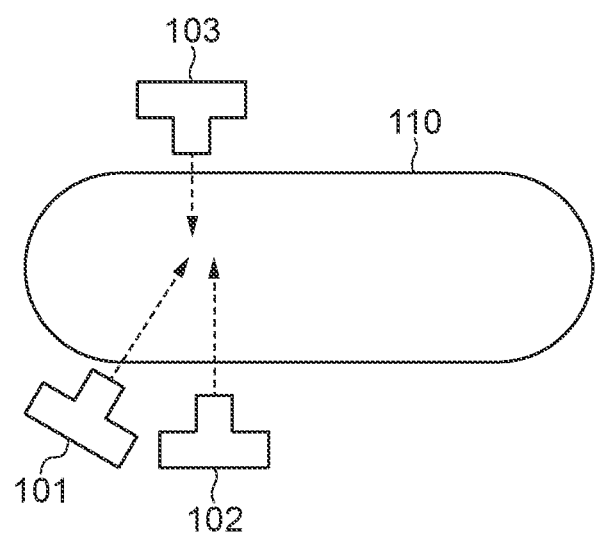

FIG. 1B is a view illustrating an example of an arrangement of the user-operated image pickup apparatus 101 and the automatic image pickup apparatuses 102 and 103. As an example of a shooting scene, the view illustrates a scene in which an athlete during a sports competition in a sports stadium (which is not illustrated) is being shot. It is assumed that the user-operated image pickup apparatus 101 and the image pickup apparatuses 102 and 103 are located outside a competition space 110 (track, field), in other words, located in the stands. The automatic image pickup apparatus 102 is located near the user-operated image pickup apparatus 101, and hence their image pickup directions are substantially the same. On the other hand, the automatic image pickup apparatus 103 is located away from the user-operated image pickup apparatus 101, and hence their image pickup directions are different from each other.

It should be noted that the image pickup system 100 should not always have the configuration illustrated in FIGS. 1A and 1B. For example, although the image pickup system 100 is comprised of the two automatic image pickup apparatuses in the present embodiment but may be comprised of one automatic image pickup apparatus or three or more automatic image pickup apparatuses. Moreover, the user-operated image pickup apparatus 101 and the automatic image pickup apparatuses 102 and 103 should not always be placed at the locations illustrated in FIG. 1B, but they may be placed at locations desired by a user as appropriate.

Figure 2:
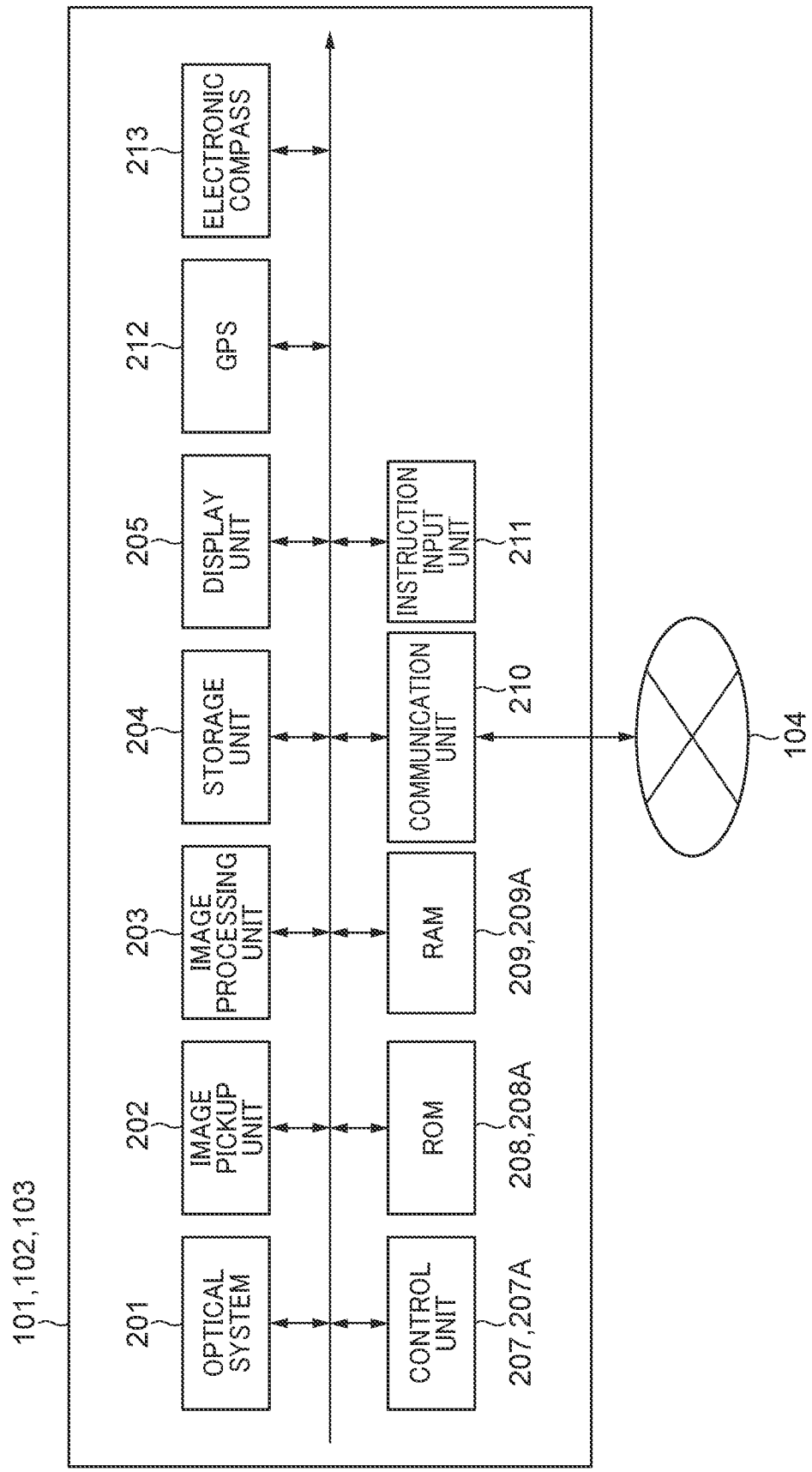
FIG. 2 is a block diagram schematically illustrating a configuration of an image pickup apparatus.

FIG. 2 is a block diagram schematically illustrating a configuration of the user-operated image pickup apparatus 101. The user-operated image pickup apparatus 101 includes an optical system 201, an image pickup unit 202, an image processing unit 203, a storage unit 204, a display unit 205, a control unit 207, a ROM 208, a RAM 209, a communication unit 210, an instruction input unit 211, a GPS 212, and an electronic compass 213.

It should be noted that the image pickup apparatuses 102 and 103 each has the configuration equivalent to that of the user-operated image pickup apparatus 101, but if the image pickup apparatuses 102 and 103 have any unique configuration, it will be explained as the need arises. For the convenience of explanation about how to control operations in the image pickup apparatuses 102 and 103 referring to flowcharts of FIGS. 3A and 3B, a control unit, ROM, and RAM of the image pickup apparatuses 102 and 103 will be designated by reference symbols 207A, 208A, and 209A, respectively.

The optical system 201 includes a lens group, which includes a zoom lens and a focus lens, and a diaphragm, and forms a subject image on a light-incident surface of the image pickup unit 202 (image pickup device). The optical system 201 is equipped with an operating ring (operating member) that allows a user to directly control the zoom and focus positions of the optical system 201 although it is not illustrated in the drawings. It should be noted that each of the image pickup apparatuses 102 and 103 may be equipped with an operating unit that controls the zoom position on the optical system 201 thereof under the control of the control unit 207A.

The image pickup unit 202 is an image pickup device (image sensor) like a CCD sensor or CMOS sensor, which is configured to output a picked-up image obtained by capturing an image of a subject through the optical system 201. The image pickup unit 202 is configured to handle an analog image signal, which is obtained by photoelectrically converting an optical image formed on the light-incident surface of the image pickup unit 202 by the optical system 201, and convert, through an A/D converter (which is not illustrated), the analog image signal into RAW image data comprised of a digital signal. The RAW image data is output to the RAM 209 and temporarily stored in the RAM 209.

The image processing unit 203 is configured to generate image data in predetermined formats by subjecting RAW image data stored in the RAM 209 to various types of image processing such as white balance adjustment, color interpolation, gamma processing, and NR processing. The image data generated by the image processing unit 203 is sent to and stored in the storage unit 204. The control unit 207, which is, for example, a CPU, is configured to read out predetermined control programs from the ROM 208 and load them into the RAM 209 to integratedly control operations of components of the user-operated image pickup apparatus 101. The control unit 207 is configured to, for example, based on brightness information on a shooting scene, determine shooting parameters, such as an aperture value of the optical system 201 and a shutter speed and an ISO sensitivity for the image pickup unit 202, and control operations of the corresponding components. As will be described later, the control unit 207A of each of the automatic image pickup apparatuses 102 and 103 is further configured to carry out a process of changing shooting parameters based on information sent from the user-operated image pickup apparatus 101.

The ROM 208, which is a nonvolatile memory capable of electrically erasing and storing data, stores operation programs for the components of its own apparatus and parameters and others required for operation of the components. The RAM 209, which is a rewritable volatile memory, has a work area into which programs executed by the control unit 207 and others are loaded and a storage area in which data generated by operations of the components and other data are temporarily stored. The storage unit 204, which is, for example, a removal memory card, stores image data processed by the image processing unit 203.

The display unit 205, which is, for example, a liquid crystal display, is configured to display images stored in the RAM 209 and images recorded in the storage unit 204 and also display a GUI for receiving instructions from a user. The instruction input unit 211, which includes a touch panel, an operating button, and/or the like, is configured to receive an instruction from a user and notifies the control unit 207 of the received instruction. Based on an instruction (signal) received from the instruction input unit 211, the control unit 207 is configured to make predetermined settings and control the components of its own apparatus to perform predetermined operations.

The instruction input unit 211 includes a shutter button, a first switch that is turned on by a half-press action of the shutter button, and a second switch that is turned on by a full-press operation of the shutter button. Upon detecting an on-signal from the first switch, the control unit 207 is configured to perform a shooting preparatory operation, and upon detecting an on-signal from the second switch, the control unit 207 is configured to perform a main shooting operation. The shooting preparatory operation includes AE (automatic exposure) control process, AF (automatic focus) control process, and so forth. The main shooting operation means a sequential process from obtainment of an image signal by the image pickup unit 202 to storage of image data, which is obtained through a development process by the image processing unit 203, in the storage unit 204.

A user is allowed to change a setting value of a shooting parameter in the user-operated image pickup apparatus 101 via the instruction input unit 211. For example, a user is allowed to specify a setting value of exposure compensation in order to change the brightness of an image on purpose. It should be noted that the automatic image pickup apparatuses 102 and 103 need not be equipped with the instruction input unit 211 configured to receive user's operations, the display unit 205 configured to display images for a user, and so forth, which are not required for automatic shooting.

The communication unit 210 is configured to carry out communications with other image pickup apparatuses, which perform shooting in conjunction with the user-operated image pickup apparatus 101, via the communication network 104. As will be described later, the communication unit 210 of the user-operated image pickup apparatus 101 is configured to send, for example, a value which represents a characteristic of a shooting scene (hereafter referred to as a "feature value") and the amount of change in shooting parameter to the automatic image pickup apparatuses 102 and 103. The communication unit 210 of each of the automatic image pickup apparatuses 102 and 103 is configured to receive information sent from the user-operated image pickup apparatus 101.

The GPS 212 is configured to receive GPS signals from a GPS satellite to obtain positional information on the user-operated image pickup apparatus 101. The electronic compass 213 is a magnetic sensor, which is configured to detect the earth's magnetism, and obtain information on the shooting direction of the user-operated image pickup apparatus 101.

A description will now be given of an operational flow in the image pickup system 100. First, a description will be given of a process flow in the user-operated image pickup apparatus 101 with reference to FIG. 3A. FIG. 3A is a flowchart useful in explaining the flow of control according to the first embodiment, which is executed in the user-operated image pickup apparatus 101 during a shooting operation performed by the image pickup system 100. Processes (steps) represented by S numbers in the flowchart of FIG. 3A are implemented by the control unit 207 loading predetermined programs stored in the ROM 208 into the RAM 209 and integratedly controlling operations of the components of the user-operated image pickup apparatus 101.

In S301, the control unit 207 performs a shooting preparatory operation. Specifically, the control unit 207 controls operation of the components of its own apparatus (the user-operated image pickup apparatus 101) by carrying out the AE control process, in which the control unit 207 analyzes a present shooting scene in a live view image (picked-up image) obtained through the image pickup unit 202 and automatically determines shooting parameters (shooting conditions) such as an aperture value, shutter speed, ISO sensitivity, and white balance, which are to be set for its own apparatus. When the shooting preparatory operation is completed, the live view image that has been subjected to the image processing by the image processing unit 203 is displayed on the display unit 205.

A description will now be given of the AE control process, in which exposure conditions are determined, as an example of a process of determining the shooting parameters. During the shooting preparatory operation, the control unit 207 analyzes a live view image obtained through the image pickup unit 202 and detects a main subject area. For example, the control unit 207 detects a particular type of a subject like a person's face and sets the detected area as the main subject area. The control unit 207 calculates the average brightness of the detected main subject area and determines values of parameters relating to the exposure conditions such as an aperture value, shutter speed, and ISO sensitivity according to a program diagram prepared in advance so that the obtained average brightness approaches a target value determined in advance.

A live view image and pixel histogram given after the shooting parameters are set, are displayed on the display unit 205. By checking the live view image and the pixel histogram displayed on the display unit 205, a user can determine whether or not the shooting parameters determined by the user-operated image pickup apparatus 101 match his/her shooting intent. When the user determines that the set shooting parameters do not match the shooting intent, he/she is allowed to instruct the control unit 207 to change a corresponding shooting parameter via the instruction input unit 211. For example, when the user determines that the main subject area is darker (brighter) than the shooting intent, he/she is allowed to instruct the control unit 207 to make an exposure compensation setting brighter (darker) than a default setting via the instruction input unit 211.

In S302, the control unit 207 determines whether or not a shooting parameter changing instruction issued by a user has been received via the instruction input unit 211. It should be noted that changes made by the shooting parameter changing instruction in S302 do not include changing of the shooting parameters through the AE control process performed by the control unit 207. When determining that a shooting parameter changing instruction has been received (Yes in S302), the control unit 207 carries out a process in S303, and when determining that a shooting parameter changing instruction has not been received (No in S302), the control unit 207 carries out a process in S306.

In S303, in accordance with the shooting parameter changing instruction from a user, the control unit 207 changes a shooting parameter set for the components of its own apparatus (the user-operated image pickup apparatus 101). Here, a description will be given of a case where a user changes an exposure compensation setting. For example, when the control unit 207 is instructed to make the exposure compensation setting brighter (darker) than a default setting, the control unit 207 changes at least one of shooting parameters relating to the exposure conditions in accordance with the program diagram prepared in advance so that the picked-up image becomes brighter (darker). As an example, in a case where the ISO sensitivity determined in S301 is ISO 800 and the control unit 207 is instructed to change the exposure compensation setting by +1 stop (−1 stop), the control unit 207 changes the ISO sensitivity to ISO 1600 (ISO 400).

In S304, the control unit 207 calculates a feature value of a present shooting scene in a live view image currently obtained through the image pickup unit 202. Since a description is now given of a case where the user changes an exposure compensation setting in S302, it is hence assumed that the control unit 207 calculates a backlight level (a value that represents the degree of backlight) of the present shooting scene as the feature value of the present shooting scene in this step. It should be noted that how to calculate the backlight level will be described in detail later.

In S305, the control unit 207 notifies (sends) the automatic image pickup apparatuses 102 and 103 of information on the backlight level, which is the feature value of the shooting scene obtained in S304, and the amount of change in shooting parameter (the amount of exposure compensation), which is specified by the user, via the communication unit 210.

In S306, the control unit 207 determines whether or not a shooting instruction issued by the user has been received via the instruction input unit 211. When the user performs a full-press operation on the shutter button, the control unit 207 is notified of a shooting instruction by the instruction input unit 211. When determining that the shooting instruction has been received (Yes in S306), the control unit 207 carries out a process in S307, and when the control unit 207 determines that the shooting instruction has not been received (No in S306), the process returns to S301.

In S307, the control unit 207 carries out the main shooting operation, which completes the present process.

Figure 3B:
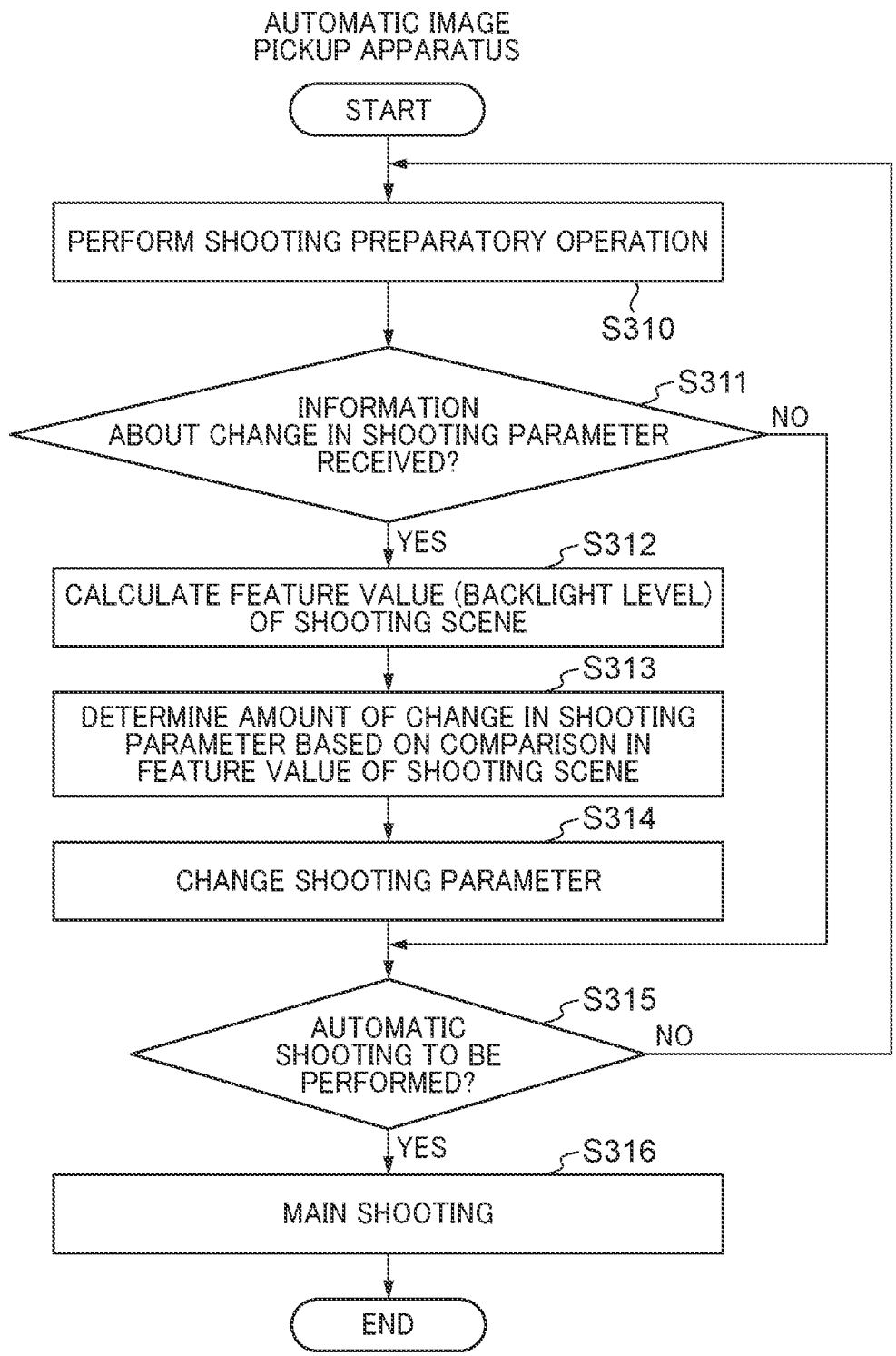

A description will now be given of a control flow in the automatic image pickup apparatuses 102 and 103 with reference to FIG. 3B. FIG. 3B is a flowchart useful in explaining the control flow according to the first embodiment, which is executed in the automatic image pickup apparatus 102 during a shooting operation performed by the image pickup system 100. Processes (steps) represented by S numbers in the flowchart of FIG. 3B are implemented by the control unit 207A loading predetermine programs stored in the ROM 208A into the RAM 209A to integratedly control operation of the components of the automatic image pickup apparatus 102.

It should be noted that the automatic image pickup apparatuses 102 and 103 operate in the same way, and hence a description of the control flow in the automatic image pickup apparatus 103 is omitted. As will be described later, the user-operated image pickup apparatus 101 and the automatic image pickup apparatuses 102 and 103 may differ in shooting parameters to be set, and also the automatic image pickup apparatuses 102 and 103 may differ in shooting parameters to be set.

In S310, the control unit 207A performs a shooting preparatory operation. The shooting preparatory operation in S310 is performed in the same manner as the shooting preparatory operation performed in S301 in the user-operated image pickup apparatus 101. However, the user-operated image pickup apparatus 101 and the automatic image pickup apparatuses 102 and 103 analyze a shooting scene independently from one another, and thus shooting parameters determined by the user-operated image pickup apparatus 101 and the automatic image pickup apparatuses 102 and 103 are not always the same.

In S311, the control unit 207A determines whether or not information about a feature value (backlight level) of the shooting scene and the amount of change in shooting parameter (the amount of exposure compensation) has been received from the user-operated image pickup apparatus 101. When determining that the information has been received (Yes in S311), the control unit 207A carries out a process in S312, and when determining that the information has not been received (No in S311), the control unit 207A carries out a process in S315.

In S312, the control unit 207A calculates a feature value of a present shooting scene in a live view image (picked-up image) currently obtained through an image pickup process by its own apparatus (the automatic image pickup apparatus 102). It is assumed here that the control unit 207A calculates a backlight level that represents the degree of backlight as with the step S304.

In S313, the control unit 207A determines the amount of change in shooting parameter for its own apparatus based on a result of comparison between the backlight level received from the user-operated image pickup apparatus 101 and the backlight level of the picked-up image obtained by its own apparatus, and the amount of change in shooting parameter received from the user-operated image pickup apparatus 101. It should be noted that how to determine the amount of change in shooting parameter for the automatic image pickup apparatus 102 in S313 will be described in detail later.

In S314, based on the amount of change in shooting parameter determined in S313, the control unit 207A changes the shooting parameter set for the components of its own apparatus.

In S315, based on the shooting scene and subject detection results, the control unit 207A decides whether or not to perform automatic shooting. For example, the control unit 207A may perform automatic shooting when a particular type of a subject like a person is detected in the shooting scene. Other than that, when a user has issued a shooting instruction to the user-operated image pickup apparatus 101 (the control unit 207 is instructed to perform shooting), the control unit 207A may receive the information of the user's shooting instruction and perform shooting in accordance with the timing of shooting in the user-operated image pickup apparatus 101. When deciding to perform automatic shooting (Yes in S315), the control unit 207A carries out a process in S316, and when deciding not to perform automatic shooting (No in S315), the process returns to S310.

In S316, the control unit 207A performs a main shooting operation, which completes the present process. In a case where the control unit 207A receives the feature value of the shooting scene from the user-operated image pickup apparatus 101 in S311, the control unit 207A performs the main shooting operation based on the shooting parameters set for its own apparatus changed in S314. In the other case where the control unit 207A does not receive the feature value of the shooting scene from the user-operated image pickup apparatus 101 in S311, the control unit 207A performs the main shooting operation based on shooting parameters automatically determined by analyzing a live view image (picked-up image) currently obtained through the image pickup unit 202A.

A detailed description will now be given of how the automatic image pickup apparatuses 102 and 103 determines the amounts of change in shooting parameter in S313. Here, the case where a backlight level is calculated as a value representing a feature of a shooting scene is taken as an example in the following description as well. It should be noted that in the following description, the arrangement of the user-operated image pickup apparatus 101 and the automatic image pickup apparatuses 102 and 103 illustrated in FIG. 1B is not considered into the determination, and a case where their arrangement is taken into the consideration will be described separately.

Figure 4A:
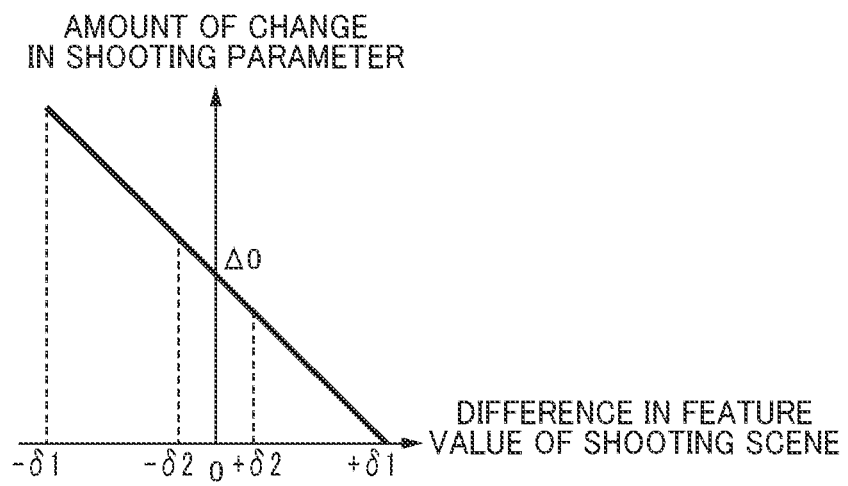
FIGS. 4A and 4B are schematic views useful in explaining how to change shooting parameters for the automatic image pickup apparatuses.
Figure 4B:
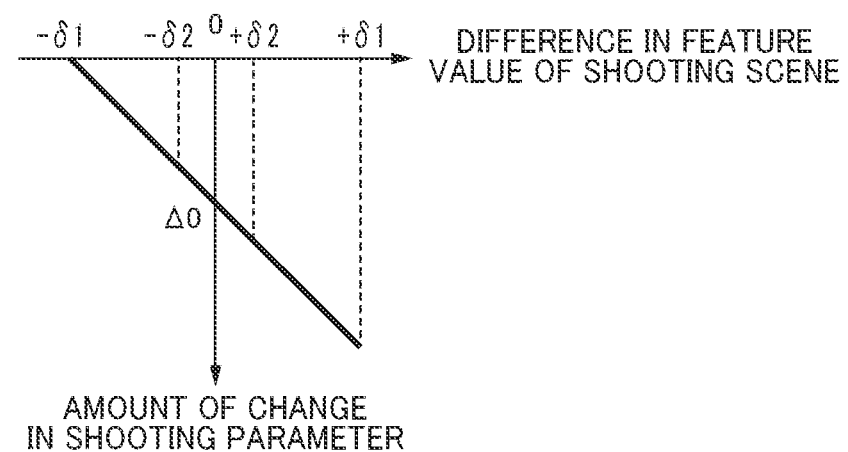

FIGS. 4A and 4B are schematic views useful in explaining how the control unit 207A of one of the automatic image pickup apparatuses 102 and 103 change its shooting parameter. In the diagrams of FIGS. 4A and 4B, the horizontal axis represents the difference in the feature value of the shooting scene, and the vertical axis represents the amount of change in shooting parameter (that is, the amount of exposure compensation). It should be noted that the difference in the feature value of the shooting scene means the difference between the backlight level obtained in the user-operated image pickup apparatus 101 and the backlight level obtained in one of the automatic image pickup apparatuses 102 and 103. FIGS. 4A and 4B correspond to cases where the amount of exposure compensation (AO) specified by a user is positive and negative, respectively.

The backlight level is obtained by dividing the average brightness of a background area by the average brightness of a main subject area, that is, according to the following equation, the backlight level=(the average brightness of a background area/the average brightness of a main subject area).

In the same manner as in S301 described above, the control unit 207A detects a main subject area in a live view image and calculates the average brightness of the detected main subject area. The control unit 207A further detects an area other than the main subject area as a background area and calculates the average brightness of the detected background area. The backlight level can be obtained by applying the average values thus obtained to the above equation. It should be noted that the backlight level in the user-operated image pickup apparatus 101 can be obtained in the same manner.

As the backlight level, which is a brightness ratio between the background area and the main subject area, increases, the extent to which the shooting scene is backlit is assumed to increase. As illustrated in FIGS. 4A and 4B, according to the difference in backlight level, which is the feature value of the shooting scene, the control unit 207A determines the amount of exposure compensation for its own apparatus. At the position on the vertical axis which indicates "0" in each of FIGS. 4A and 4B, the backlight level obtained by the user-operated image pickup apparatus 101 and the backlight level obtained by the one of the automatic image pickup apparatuses 102 and 103 are equal. In this case, by performing exposure compensation in the one of the automatic image pickup apparatuses 102 and 103 by the same amount as the amount of exposure compensation (AO) set by a user for the user-operated image pickup apparatus 101, the user's shooting intent can be reflected on images taken by the one of the automatic image pickup apparatuses 102 and 103 as well. For example, assume that the ISO sensitivity determined for the one of the automatic image pickup apparatuses 102 and 103 is ISO 1600. In this case, when the amount of exposure compensation specified by a user is +1 stop (−1 stop), the one of the automatic image pickup apparatuses 102 and 103 changes the ISO sensitivity to ISO 3200 (ISO 800).

A positive value of the difference in the feature value of the shooting scene means that the backlight level obtained by the user-operated image pickup apparatus 101 is greater than the backlight level obtained by the one of the automatic image pickup apparatuses 102 and 103. Accordingly, in a case where the amount of exposure compensation for the user-operated image pickup apparatus 101 is positive (negative), the absolute value of the amount of exposure compensation for the one of the automatic image pickup apparatuses 102 and 103 is set to a smaller (greater) value than that of the absolute value of the amount of exposure compensation set for the user-operated image pickup apparatus 101 by a user. It should be noted that the positive/negative directions of exposure compensation for the user-operated image pickup apparatus 101 and the automatic image pickup apparatuses 102 and 103 are the same.

On the other hand, a negative value of the difference in the feature value of the shooting scene means that the backlight level obtained by the user-operated image pickup apparatus 101 is smaller than the backlight level obtained by the one of the automatic image pickup apparatuses 102 and 103. Accordingly, in a case where the amount of exposure compensation for the user-operated image pickup apparatus 101 is positive (negative), the absolute value of the amount of exposure compensation for the one of the automatic image pickup apparatuses 102 and 103 is set to a greater (smaller) value than that of the absolute value of the amount of exposure compensation set for the user-operated image pickup apparatus 101 by a user. It should be noted that the positive/negative directions of exposure compensation for the user-operated image pickup apparatus 101 and the one of the automatic image pickup apparatuses 102 and 103 are the same.

As described above, when exposure compensation is performed in the user-operated image pickup apparatus 101, the user-operated image pickup apparatus 101 and the automatic image pickup apparatuses 102 and 103 may differ in the feature value of the shooting scene. In this case, in the present embodiment, the amounts of exposure compensation for the respective automatic image pickup apparatuses 102 and 103 are determined according to the respective difference in the feature value of the shooting scene so that the backlight levels after exposure compensation in all the image pickup apparatuses become substantially equal. As a result, even when the backlight levels obtained in the image pickup apparatuses are different, the shooting parameters can be changed for the image pickup apparatuses to respective values on which the user's shooting intent is reflected.

Moreover, in the present embodiment, the image pickup apparatuses determine their respective shooting parameters by analyzing the shooting scene, use the respective reference values as reference values, and change their respective shooting parameters according to the amount of change in shooting parameter specified by a user. As a result, even when the image pickup apparatuses differ in the angle of view and/or a subject, the shooting parameters can be appropriately determined for the respective image pickup apparatuses.

FIGS. 4A and 4B further indicate that in a case where the absolute value of the difference in the feature value of the shooting scene is greater than a predetermined value $\delta 1$ (second value), the change in shooting parameter for the one of the automatic image pickup apparatuses 102 and 103 is not carried out. That is, in a case where the absolute value of the difference in the feature value of the shooting scene is equal to or smaller than the predetermined value $\delta 1$, the shooting parameter for the one of the automatic image pickup apparatuses 102 and 103 is changed according to the difference so that the feature value obtained in the user-operated image pickup apparatus 101 and the feature value obtained in the one of the automatic image pickup apparatuses 102 and 103 become substantially equal to each other, and in the other case where the absolute value of the difference in the feature value of the shooting scene is greater than the predetermined value $\delta 1$, the shooting parameter for the one of the automatic image pickup apparatuses 102 and 103 is not changed. Examples of the case where the absolute value of the difference in the feature value of the shooting scene is greater than the predetermined value $\delta 1$ includes a case where either of the user-operated image pickup apparatus 101 and the one of the automatic image pickup apparatuses 102 and 103 shoots a front-lit scene and the other one shoots a backlit scene (which will be described later). By adjusting the shooting parameter for the one of the automatic image pickup apparatuses 102 and 103 according to the absolute value of the difference in the feature value of the shooting scene in this manner, it is possible to prevent excessive exposure compensation different from the user's shooting intent in the one of the automatic image pickup apparatuses 102 and 103.

Although the amount of change in shooting parameter is changed continuously (specifically, linearly) in FIGS. 4A and 4B, the shooting parameter should not always be changed in this manner. For example, in a case where the absolute value of the difference in the backlight level of the shooting scene is equal to or smaller than a predetermined value $\delta 2$ (first value) determined in advance (for example, the value of the difference is equal to or greater than $-\delta 2$ or is equal to or smaller than $+\delta 2$) in FIGS. 4A and 4B, the amount of exposure compensation set for the user-operated image pickup apparatus 101 may be applied directly to the amounts of exposure compensation for the one of the automatic image pickup apparatuses 102 and 103. Alternatively, in the same case, the amount of change obtained by subtracting a predetermined value from the amount of change in shooting parameter for the user-operated image pickup apparatus 101 may be applied to the amount of exposure compensation for the one of the automatic image pickup apparatuses 102 and 103. In addition to them, in a case where the absolute value of the difference in backlight level is greater than the predetermined value $\delta 2$ (for example, the value of the difference is smaller than $-\delta 2$ or is greater than $+\delta 2$), the amount of change in shooting parameter indicated in FIGS. 4A and 4B may be applied to the amounts of exposure compensation for the one of the automatic image pickup apparatuses 102 and 103. In other words, in a case where the absolute value of the difference in backlight level is equal to or smaller than the predetermined value $\delta 2$, the shooting parameter for the one of the automatic image pickup apparatuses 102 and 103 may be changed by the same amount as the amount of change in shooting parameter set for the user-operated image pickup apparatus 101 or by an amount obtained by subtracting a predetermined amount from the amount of change in shooting parameter set for the user-operated image pickup apparatus 101. In another case where the absolute value of the difference in backlight level is greater than the predetermined value $\delta 2$ and equal to or smaller than the predetermined value $\delta 1$, which is greater than the predetermined value $\delta 2$, the shooting parameter for the one of the automatic image pickup apparatuses 102 and 103 may be changed according to the difference so that the feature value obtained in the user-operated image pickup apparatus 101 and the feature value obtained in the one of the automatic image pickup apparatuses 102 and 103 become substantially equal. In the other case where the absolute value of the difference in backlight level is greater than the predetermined value $\delta 1$, the shooting parameter for the one of the automatic image pickup apparatuses 102 and 103 may not be changed. Although FIGS. 4A and 4B indicate the predetermined value $\delta 2$ set to a value close to zero (0), the predetermined value $\delta 2$ may have a value close to the predetermined value $\delta 1$.

It should be noted that histogram information on a live view image may be used for the calculation of the backlight level as the feature value of the shooting scene, and the backlight level may be calculated based on the percentage of pixels whose pixel values fall within a predetermined range determined in advance. As another example, the percentage of a main subject area in an image may be used as the feature value of the shooting scene. In this case, the amount of change in shooting parameter for one of the automatic image pickup apparatuses 102 and 103 should be adjusted according to a difference between the percentage of a main subject area in a live view image obtained by the one of the automatic image pickup apparatuses 102 and 103 and the percentage of a main subject area in a live view image obtained by the user-operated image pickup apparatus 101.

As the feature value of the shooting scene, a feature value representing the brightness of a main subject may be used instead of the backlight level. In this case, the amount of change in shooting parameter for one of the automatic image pickup apparatuses 102 and 103 may be determined based on a result of comparison between the brightness of the main subject in the user-operated image pickup apparatus 101 and that in the one of the automatic image pickup apparatuses 102 and 103.

In the above description, examples were given of how to determine the amounts of change in shooting parameter for one of the automatic image pickup apparatuses 102 and 103 and of whether or not to change the shooting parameter, which are controlled according to only a difference in the backlight level as an example of the feature value of the shooting scene. The way to control the amounts of change in shooting parameter for one of the automatic image pickup apparatuses 102 and 103 and of whether or not to change the shooting parameter are not limited to them, but may use feature values of the shooting scene in combination with the difference in the feature values of the shooting scene.

For example, the shooting parameter for one of the automatic image pickup apparatuses 102 and 103 may be changed only when both the user-operated image pickup apparatus 101 and the one of the automatic image pickup apparatuses 102 and 103 are shooting a backlit scene (the backlight levels obtained by the apparatuses are equal to or greater than a predetermined threshold value). Likewise, the shooting parameter for one of the automatic image pickup apparatuses 102 and 103 may be changed only when both the user-operated image pickup apparatus 101 and the one of the automatic image pickup apparatuses 102 and 103 are shooting a front-lit scene (the backlight levels obtained by the apparatuses are smaller than the predetermined threshold value).

A description will now be given of a concrete example of a result of the above control when the user-operated image pickup apparatus 101 and the automatic image pickup apparatuses 102 and 103 are placed as illustrated in FIG. 1B. Since the user-operated image pickup apparatus 101 and the automatic image pickup apparatus 102 are located close to each other, and are oriented in substantially the same pickup direction, it is considered that the values of the backlight levels obtained by the user-operated image pickup apparatus 101 and the automatic image pickup apparatus 102 are close to each other. Thus, when a user makes an exposure compensation setting for the user-operated image pickup apparatus 101, the exposure compensation setting is reflected on the automatic image pickup apparatus 102 and the corresponding exposure conditions for the automatic image pickup apparatus 102 are changed. As a result, the shooting parameters matching the user's shooting intent are set in the automatic image pickup apparatus 102 as well.

On the other hand, the automatic image pickup apparatus 103 is located away from the user-operated image pickup apparatus 101, and their image pickup directions are substantially opposite. The values of the backlight levels obtained by the user-operated image pickup apparatus 101 and the automatic image pickup apparatus 103 are thus considered to be different. For example, in a case where the user-operated image pickup apparatus 101 is in a backlit state, the automatic image pickup apparatus 103 is in a front-lit state, and the absolute value of a difference between their backlight levels is greater than a predetermined value δ, an exposure compensation setting for the user-operated image pickup apparatus 101 is not reflected on the automatic image pickup apparatus 103. Thus, in a case where there is a great difference in the feature value of the shooting scene, the change in shooting parameter for the corresponding automatic image pickup apparatus is not carried out, which prevents excessive exposure compensation being different from the user's shooting intent.

As described earlier, the shooting parameter for one of the automatic image pickup apparatuses 102 and 103 may be changed only when the feature values obtained by both the user-operated image pickup apparatus 101 and the one of the automatic image pickup apparatuses 102 and 103 are equal to or greater than the predetermined threshold value. For example, in a case where the user-operated image pickup apparatus 101 in a backlit state and the automatic image pickup apparatus 103 in a front-lit state are under such a control, exposure compensation is not performed in the automatic image pickup apparatus 103 even if an exposure compensation setting is made in the user-operated image pickup apparatus 101.

According to the first embodiment, the user-operated image pickup apparatus 101 and the automatic image pickup apparatuses 102 and 103 perform shooting in conjunction with each other. To perform the shooting, the automatic image pickup apparatuses 102 and 103 determine respective amounts of change in their shooting parameter based on the amount of change in shooting parameter set for the user-operated image pickup apparatus 101 by a user and respective results of comparison between the feature value of the shooting scene obtained by the user-operated image pickup apparatus 101 and the feature value of the shooting scene obtained by themselves. As a result, the change in shooting parameter on which the user's shooting intent is reflected can be applied to the automatic image pickup apparatuses 102 and 103 as well. Furthermore, the automatic image pickup apparatuses 102 and 103 determine whether or not to change their shooting parameters based on the respective results of comparison between the feature value of the shooting scene obtained by the user-operated image pickup apparatus 101 and the feature value of the shooting scene obtained by themselves. As a result, excessive exposure compensation different from the user's shooting intent can be prevented from being performed in the automatic image pickup apparatuses 102 and 103.

A description will now be given of a variation of the embodiment described above. In the embodiment described above, in a case where an instruction to change the ISO sensitivity as exposure compensation for the user-operated image pickup apparatus 101 is issued, also the ISO sensitivity is changed for the automatic image pickup apparatuses 102 and 103 so that images picked up by the automatic image pickup apparatuses 102 and 103 are properly changed in brightness. However, the shooting parameter to be changed is not limited to the ISO sensitivity. For example, as the shooting parameter, the aperture value or the shutter speed may be changed according to a predetermined program diagram. Moreover, when a user issues an instruction to change the aperture value or the shutter speed of the user-operated image pickup apparatus 101, instead of the ISO sensitivity, the same shooting parameter as the shooting parameter changed by the user may be changed for the automatic image pickup apparatuses 102 and 103 so that of their picked-up images are properly changed in brightness.

As another variation of the shooting parameter to be changed, a characteristic of tone correction to be applied by the image processing unit 203 may be changed. For example, when the control unit 207 of the user-operated image pickup apparatus 101 is instructed to decrease the backlight level by a predetermined amount, characteristics of tone correction for both the user-operated image pickup apparatus 101 and the automatic image pickup apparatuses 102 and 103, which are subjected to dark areas in their respective picked-up images, may be changed so that the dark areas become brighter.

In the example described above, the backlight levels are calculated as the feature values of the shooting scene, and the automatic image pickup apparatuses 102 and 103 carry out the change in their shooting parameter by determining the respective amounts of exposure compensation. However, the feature values of the shooting scene and the change in shooting parameter are not limited to them. For example, when the control unit 207 of the user-operated image pickup apparatus 101 is instructed to change the shutter speed, which has been determined in S301, by a predetermined amount via the instruction input unit 211 by a user, both the user-operated image pickup apparatus 101 and the automatic image pickup apparatuses 102 and 103 may calculate the respective magnitudes of motion blur as the feature values of the shooting scene. Specifically, assume that the control unit 207 of the user-operated image pickup apparatus 101 is instructed to increase the shutter speed by a predetermined amount. In response to this instruction, the control units of both the user-operated image pickup apparatus 101 and one of the automatic image pickup apparatuses 102 and 103 analyze respective live view images currently obtained and calculate the respective magnitudes of motion vectors in main subject areas of the live view images as the magnitudes of motion blur. The control unit 207A of the one of the automatic image pickup apparatuses 102 and 103 changes the shutter speed of its own apparatus in a case where the magnitude of motion blur obtained by itself is equal to or greater than the magnitude of motion blur obtained by the user-operated image pickup apparatus 101, and does not change the shutter speed of its own apparatus in a case where the magnitude of motion blur obtained by itself is smaller than the magnitude of motion blur obtained by the user-operated image pickup apparatus 101. Moreover, when the control unit 207 of the user-operated image pickup apparatus 101 is instructed to change the amount of exposure compensation by a predetermined amount via the instruction input unit 211 by a user, the shutter speed of the one of the automatic image pickup apparatuses 102 and 103 may be changed based on the amount of exposure compensation and a result of comparison in the magnitudes of motion blur as the feature values of the shooting scene.

For another example, when the control unit 207 of the user-operated image pickup apparatus 101 is instructed to change the ISO sensitivity, which has been determined in S301, by a predetermined amount via the instruction input unit 211 by a user, the amounts of noise in picked-up images may be used as the features value of the shooting scene for both the user-operated image pickup apparatus 101 and the automatic image pickup apparatuses 102 and 103. Specifically, assume that the control unit 207 of the user-operated image pickup apparatus 101 is instructed to change the ISO sensitivity by a predetermined amount to a smaller value. In response to this instruction, the control units of both the user-operated image pickup apparatus 101 and one of automatic image pickup apparatuses 102 and 103 calculate the respective amounts of noise in main subject areas in live view images currently obtained by the image pickup apparatuses. The control unit 207A of the one of automatic image pickup apparatuses 102 and 103 reflects the change in ISO sensitivity on the ISO sensitivity of its own apparatus in a case where the amount of noise obtained by itself is equal to or greater than the amount of noise obtained by the user-operated image pickup apparatus 101, and does not reflect the change in ISO sensitivity on the ISO sensitivity of its own apparatus in a case where the amount of noise obtained by itself is smaller than the amount of noise obtained by the user-operated image pickup apparatus 101.

For another example, when the control unit 207 of the user-operated image pickup apparatus 101 is instructed to change a characteristic of a noise removal process via the instruction input unit 211 by a user, the amounts of noise may be used as the feature values of the shooting scene for both the user-operated image pickup apparatus 101 and the automatic image pickup apparatuses 102 and 103. Specifically, assume that the control unit 207 of the user-operated image pickup apparatus 101 is instructed to intensity the noise removal process to a greater extent than usual. In this case, the control unit 207A of one of the automatic image pickup apparatuses 102 and 103 reflects this change in noise removal process on the noise removal process of its own apparatus in a case where the amount of noise obtained in its own apparatus is equal to or greater than the amount of noise obtained in the user-operated image pickup apparatus 101, and does not reflect the change in noise removal process on the noise removal process of its own apparatus in a case where the amount of noise obtained in its own apparatus is smaller than the amount of noise obtained in the user-operated image pickup apparatus 101. Moreover, when the control unit 207 of the user-operated image pickup apparatus 101 is instructed to change the amount of exposure compensation by a predetermined amount via the instruction input unit 211 by a user, the automatic image pickup apparatuses 102 and 103 may change at least one of their ISO sensitivity or characteristics of their noise removal process based on the amount of exposure compensation and respective results of comparison in the amounts of noise as the feature values of the shooting scene.

In the above description, it is assumed that a user gives instructions for a series of operations of the user-operated image pickup apparatus 101 from the shooting preparatory operation to the main shooting operation. However, the instructions given by a user are not limited to them, but for example, after the shooting preparatory operation, the user may instruct the user-operated image pickup apparatus 101 to change only the shooting parameter, and the control unit 207 of the user-operated image pickup apparatus 101 may perform the main shooting operation at its own judgement as with the operations of the automatic image pickup apparatuses 102 and 103.

Moreover, the instruction to carry out the change in shooting parameter and the shooting instruction should not always be input to the user-operated image pickup apparatus 101 from the instruction input unit 211, but may be input from an external instruction unit. For example, various types of instructions may be input to the user-operated image pickup apparatus 101 in response to user's operations performed on an external apparatus like a smartphone or a personal computer, configured to be capable of communicating with the user-operated image pickup apparatus 101.

In addition, in the above description, at the time when a change in shooting parameter is carried out in the user-operated image pickup apparatus 101 according to user's operation, the control unit 207A of each of the automatic image pickup apparatuses 102 and 103 decides whether or not to carry out the change in shooting parameter for its own apparatus. However, the time when the change in shooting parameter is carried out in the automatic image pickup apparatuses 102 and 103 is not limited to this. For example, at the time when the control unit 207 of the user-operated image pickup apparatus 101 detects that the shooting scene or the feature value of the shooting scene has changed, the control unit 207 may automatically decide whether or not to carry out a change in shooting parameter for its own apparatus. Then, when the control unit 207 of the user-operated image pickup apparatus 101 decides to carry out the change in shooting parameter for its own apparatus, the control unit 207 may notify the automatic image pickup apparatuses 102 and 103 of the feature value of the shooting scene and the amount of change in shooting parameter.

In the above description, in response to the instruction to carry out a change in shooting parameter issued by the user-operated image pickup apparatus 101, the control unit 207A of each of the automatic image pickup apparatuses 102 and 103 determines the amount of change in shooting parameter for its own apparatus and performs main shooting. However, the way to change the shooting parameter is not limited to this. For example, when deciding to carry out the change in shooting parameter for its own apparatus, the control unit 207A of each of the automatic image pickup apparatuses 102 and 103 may perform bracket shooting in which shooting based on the shooting parameter that has not yet been changed and shooting based on the shooting parameter that has been changed are successively performed.

Second Embodiment

A second embodiment differs from the first embodiment only in control performed in the user-operated image pickup apparatus 101 and the automatic image pickup apparatuses 102 and 103 in the image pickup system 100. Only features that are different from those of the first embodiment will be described below, and the system configuration and the apparatus configuration will thus not be described.

In the first embodiment, the change in shooting parameter is carries out based on the feature values of the shooting scene calculated by analyzing the picked-up images obtained by the respective image pickup apparatuses. On the other hand, in the second embodiment, the feature values of the shooting scene are determined based on information about the arrangement of the image pickup apparatuses. Thus, as for the user-operated image pickup apparatus 101, the second embodiment differs from the first embodiment in the processes in S304 and S305, and as for the automatic image pickup apparatuses 102 and 103, the second embodiment differs from the first embodiment in the processes in S312 and S313. For this reason, these differences will be focused in the following description, and the same processes as those in the first embodiment will not be described.

In a case where the image pickup apparatuses are placed as illustrated in FIG. 1B, the feature value of the shooting scene which represents for example whether or not the shooting scene is backlit or not and is obtained by the user-operated image pickup apparatus 101 can be close to or away from the feature values of the shooting scene obtained by the automatic image pickup apparatuses 102 and 103 depending on their installation locations and image pickup directions.

Accordingly, the control unit 207 of the user-operated image pickup apparatus 101 calculates the feature values of the shooting scene in S304. Specifically, the control unit 207 uses the GPS 212 and/or the electronic compass 213, which its own apparatus has, to calculate information about the location at which its own apparatus is located (geographic location or coordinates at which it is installed) and the image pickup direction as the feature values of the shooting scene. In S305, the control unit 207 sends the information about the installation location and the image pickup direction calculated as the feature values of the shooting scene in S304 as well as the amount of change in shooting parameter to the automatic image pickup apparatuses 102 and 103.

On the other hand, the control unit 207A of each of the automatic image pickup apparatuses 102 and 103 calculates the feature values of the shooting scene in S312. Specifically, the control unit 207A uses the GPS 212 and/or the electronic compass 213, which its own apparatus has, to calculate information about the location at which its own apparatus is located (geographic location or coordinates at which it is installed) and the image pickup direction as the feature values of the shooting scene. Then, in S313, the control unit 207A determines the amount of change in shooting parameter based on the amount of change in shooting parameter for the user-operated image pickup apparatus 101 and the feature values of the shooting scene.

In this determination, the control unit 207A performs a comparison in the installation location and the image pickup direction between the user-operated image pickup apparatus 101 and its own apparatus. For example, the control unit 207A changes the shooting parameter on the conditions that their installation locations are within a predetermined range determined in advance, and a difference between their image pickup directions falls within a predetermined range determined in advance (for example, 45 degrees). When the conditions are satisfied, the control unit 207A reflects a change in shooting parameter set for the user-operated image pickup apparatus 101 on its own apparatus. On the other hand, when the conditions are not satisfied, even if the shooting parameter is changed for the user-operated image pickup apparatus 101, the control unit 207A does not reflect this change on its own apparatus. For example, in the arrangement in FIG. 1B, the change in shooting parameter is reflected on the automatic image pickup apparatuses 102, whereas the change in shooting parameter is not reflected on the automatic image pickup apparatus 103.

It should be noted that the way to determine the amounts of change in shooting parameter for the respective automatic image pickup apparatuses 102 and 103 when reflecting the amount of change in shooting parameter for the user-operated image pickup apparatus 101 on the respective automatic image pickup apparatuses 102 and 103 is as described above with reference to FIGS. 4A and 4B. In this determination, in a case where the user-operated image pickup apparatus 101 and one of the automatic image pickup apparatuses 102 and 103 are located within a predetermined range, the amount of change in shooting parameter for the one of the automatic image pickup apparatuses 102 and 103 may be determined based on only a difference (angler difference) of the image pickup directions while the distance between the user-operated image pickup apparatus 101 and the one of the automatic image pickup apparatuses 102 and 103 is ignored. Alternatively, weights may be assigned to the distance from the user-operated image pickup apparatus 101 to the one of the automatic image pickup apparatuses 102 and 103 and the difference of their image pickup directions, and based on the weighted values, the amount of change in shooting parameter for the one of the automatic image pickup apparatuses 102 and 103 may be determined.

According to the control described above, when a user has changed the shooting parameter for the user-operated image pickup apparatus 101 based on his/her shooting intent, the automatic image pickup apparatuses 102 and 103 can reflect the change without analyzing their picked-up images as long as they decide that the change is valid.

In the present embodiment described above, information about the installation locations of the image pickup apparatuses and their image pickup directions is used as information about the feature values of the shooting scene. However, the feature values of the shooting scene are not limited to them. Any information can be used as information about the feature values of the shooting scene as long as they relate to shooting parameter settings and represent features of the shooting scene. For example, information about the angles of view of shooting lenses and information about zoom positions may be used instead of or in addition to the locations of the image pickup apparatuses and their image pickup directions. In a case where the angles of views or zoom positions of the user-operated image pickup apparatus 101 and one of the automatic image pickup apparatuses 102 and 103 are close to each other, it can be considered that features of their shooting scenes are also close to each other. In this case, a change in shooting parameter for the user-operated image pickup apparatus 101 should be reflected on the one of the automatic image pickup apparatuses 102 and 103.

As another example of the feature value of the shooting scene, each of the image pickup apparatuses may use information on the size of a main subject and/or the orientation of the main subject in a picked-up image obtained by itself. For example, in a case where the main subject is a person, each of the image pickup apparatuses may detect organs of the person such as eyes, nose, and mouth, and may use the direction in which the face of the person faces in the picked-up image (for example, the person faces frontward, sideways, or rearward) as the feature value of the shooting scene. In a case where the direction in which the face of the main subject faces obtained by the user-operated image pickup apparatus 101 and that obtained by one of the automatic image pickup apparatuses 102 and 103 are close to each other, the one of the automatic image pickup apparatuses 102 and 103 may reflect a change in shooting parameter set for the user-operated image pickup apparatus 101, and in another case where the directions are different from each other, it may not reflect the change in shooting parameter.

As another example, the image pickup system 100 may be configured such that a user is allowed to designate one or both of the automatic image pickup apparatuses 102 and 103, whose feature value of a shooting scene is regarded as being the same as a feature value of a shooting scene shot by the user-operated image pickup apparatus 101. For example, the user regards a feature value of a shooting scene shot by the automatic image pickup apparatus 102, which is located close to the user-operated image pickup apparatus 101 and whose shooting direction is substantially the same as that of the user-operated image pickup apparatus 101, as being the same as a feature value of a shooting scene shot by the user-operated image pickup apparatus 101. In this case, each of the automatic image pickup apparatuses 102 and 103 may be configured to receive setting that indicates the feature value of the shooting scene shot by itself is regarded as being the same as the feature value of the shooting scene shot by the user-operated image pickup apparatus 101 via the instruction input unit, and record the received setting. The control unit 207A of the automatic image pickup apparatus 102, for which the setting has been made, does not have to obtain a difference in the feature values of the shooting scene, and hence it can directly reflect the amount of change in shooting parameter received from the user-operated image pickup apparatus 101 on image pick-up operation performed by its own apparatus.

As another example, the image pickup system 100 may be configured such that one or both of the automatic image pickup apparatuses 102 and 103, configured to perform shooting in synchronization with shooting by the user-operated image pickup apparatus 101, are controlled on the assumption that a feature value of a shooting scene shot by itself is the same as a feature value of a shooting scene shot by the user-operated image pickup apparatus 101. As another example, the automatic image pickup apparatuses 102 and 103 may be configured such that a user is allowed to estimate the backlight levels for the image pickup apparatuses based on, for example, the position of a light source in a shooting scene, and the estimated backlight levels are used as their respective feature values of the shooting scene in a process of changing their shooting parameters.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2021-214567 filed on Dec. 28, 2021, which is hereby incorporated by reference wherein in its entirety.

What is claimed is:
1. An image pickup system comprising:
a first image pickup apparatus; and
at least one second image pickup apparatus that is communicably connected to the first image pickup apparatus to perform automatic shooting,
wherein the first image pickup apparatus comprises:
a first image pickup unit that outputs a picked-up image obtained by capturing an image of a subject;
a first communication unit that communicates with the at least one second image pickup apparatus;
at least one processor; and
a memory including instructions that, when executed by the at least one processor, causes the at least one processor to:

receive a change in shooting parameter set for the first image pickup apparatus;

calculate a first feature value, which is a feature value of a shooting scene in a picked-up image obtained by the first image pickup unit using the shooting parameter changed; and notify the at least one second image pickup apparatus of the first feature value and an amount of the change in shooting parameter for the first image pickup apparatus via the first communication unit, and the at least one second image pickup apparatus each comprises:

a second image pickup unit that outputs a picked-up image obtained by capturing an image of a subject;

a second communication unit that communicates with the first image pickup apparatus;

at least one processor; and a memory including instructions that, when executed by the at least one processor, causes the at least one processor to:

receive a notification of the first feature value and the amount of the change in shooting parameter for the first image pickup apparatus from the first image pickup apparatus via the second communication unit, to calculate a second feature value, which is a feature value of a shooting scene in a picked-up image obtained by the second image pickup unit; and based on a result of comparison between the first feature value and the second feature value and the amount of the change in shooting parameter for the first image pickup apparatus, change a shooting parameter for the second image pickup apparatus.

2. The image pickup system according to claim 1, wherein in changing the shooting parameter for the second image pickup apparatus, the instructions cause the at least one processor of the second image pickup apparatus to, in a case where an absolute value of a difference between the first feature value and the second feature value is equal to or smaller than a first value determined in advance, change the shooting parameter for the second image pickup apparatus by a same amount as the amount of the change in shooting parameter for the first image pickup apparatus or an amount obtained by subtracting a predetermined amount from the amount of the change in shooting parameter for the first image pickup apparatus.

3. The image pickup system according to claim 2, wherein in changing the shooting parameter for the second image pickup apparatus, the instructions cause the at least one processor of the second image pickup apparatus to, in a case where the absolute value of the difference is greater than the first value and equal to or smaller than a second value greater than the first value, change the shooting parameter for the second image pickup apparatus according to the difference so that the second feature value becomes substantially equal to the first feature value, and in a case where the absolute value of the difference is greater than the second value, not to change the shooting parameter for the second image pickup apparatus.

4. The image pickup system according to claim 1, wherein in changing the shooting parameter for the second image pickup apparatus, the instructions cause the at least one processor of the second image pickup apparatus to, in a case where an absolute value of a difference between the first feature value and the second feature value is equal to or smaller than a value determined in advance, change the shooting parameter for the second image pickup apparatus according to the difference so that the second feature value becomes substantially equal to the first feature value, and in a case where the absolute value of the difference is greater than the value determined in advance, not to change the shooting parameter for the second image pickup apparatus.

5. The image pickup system according to claim 1, wherein in changing the shooting parameter for the second image pickup apparatus, the instructions cause the at least one processor of the second image pickup apparatus to change the shooting parameter for the second image pickup apparatus in a case where both the first feature value and the second feature value are equal to or greater than a predetermined threshold value determined in advance, or in a case where both the first feature value and the second feature value are smaller than the predetermined threshold value.

6. The image pickup system according to claim 1, wherein the first feature value and the second feature value are backlight levels or brightness of main subjects in picked-up images obtained by the first image pickup apparatus and the second image pickup apparatus, the backlight levels representing degrees of backlight in the picked-up images, and in changing the shooting parameter for the second image pickup apparatus, the instructions cause the at least one processor of the second image pickup apparatus to change a value of a same shooting parameter for the second image pickup apparatus as the shooting parameter changed for the first image pickup apparatus.

7. The image pickup system according to claim 1, wherein the first feature value and the second feature value are backlight levels or brightness of main subjects in picked-up images obtained by the first image pickup apparatus and the second image pickup apparatus, the backlight levels representing degrees of backlight in the picked-up images, and in changing the shooting parameter for the second image pickup apparatus, the instructions cause the at least one processor of the second image pickup apparatus to, in a case where the amount of the change in shooting parameter for the first image pickup apparatus is an amount of exposure compensation, change brightness or a tone correction characteristic of a picked-up image obtained by the second image pickup apparatus.

8. The image pickup system according to claim 7, wherein the brightness of the picked-up image is changed by changing at least one of an ISO sensitivity, an aperture value, or a shutter speed of the second image pickup apparatus.

9. The image pickup system according to claim 1, wherein the first feature value and the second feature value are magnitudes of subject blur in picked-up images obtained by the first image pickup apparatus and the second image pickup apparatus, and in changing the shooting parameter for the second image pickup apparatus, the instructions cause the at least one processor of the second image pickup apparatus to, in a case where the amount of the change in shooting parameter for the first image pickup apparatus is an amount of exposure compensation, change a shutter speed of the second image pickup apparatus.

10. The image pickup system according to claim 1, wherein the first feature value and the second feature value are amounts of noise in picked-up images obtained by the first image pickup apparatus and the second image pickup apparatus, and in changing the shooting parameter for the second image pickup apparatus, the instructions cause the at least one processor of the second image pickup apparatus to, in a case where the amount of the change in shooting parameter for the first image pickup apparatus is an amount of exposure compensation, change at least one of an ISO sensitivity or a characteristic of a noise removal process of the second image pickup apparatus.

11. The image pickup system according to claim 1, wherein the first feature value and the second feature value are values based on at least one of
geographical locations of the first image pickup apparatus and the second image pickup apparatus,
image pickup directions of the first image pickup apparatus and the second image pickup apparatus,
angles of view of the first image pickup apparatus and the second image pickup apparatus,
sizes of main subjects in respective picked-up images obtained by the first image pickup apparatus and the second image pickup apparatus, or
in a case where the main subjects are persons, orientations of faces of the persons.

12. The image pickup system according to claim 1, wherein the instructions in the memory of the second image pickup apparatus further causes the at least one processor of the second image pickup apparatus to receive an indication that the second feature value is equal to the first feature value, and
in changing the shooting parameter for the second image pickup apparatus, the instructions cause the at least one processor of the second image pickup apparatus to, in a case where the indication is received, change the shooting parameter for the second image pickup apparatus by a same amount as the amount of the change in shooting parameter for the first image pickup apparatus.

13. A control method for an image pickup system that comprises a first image pickup apparatus and at least one second image pickup apparatus that is communicably connected to the first image pickup apparatus to perform automatic shooting, the control method comprising:
receiving by the first image pickup apparatus a change in shooting parameter set for the first image pickup apparatus;
obtaining by the first image pickup apparatus a first feature value, which is a feature value of a shooting scene in a picked-up image obtained by a first image pickup unit of the first image pickup apparatus using the shooting parameter changed;
notifying by the first image pickup apparatus the at least one second image pickup apparatus of the first feature value and an amount of the change in shooting parameter for the first image pickup apparatus;
upon the at least one second image pickup apparatus receiving a notification of the first feature value and the amount of the change in shooting parameter for the first image pickup apparatus from the first image pickup apparatus, obtaining by the at least one second image pickup apparatus a second feature value, which is a feature value of a shooting scene in a picked-up image obtained by an image pickup unit of the at least one second image pickup apparatus; and
based on a result of comparison between the first feature value and the second feature value and the amount of the change in shooting parameter for the first image pickup apparatus, changing by the at least one second image pickup apparatus a shooting parameter for the at least one second image pickup apparatus.

14. A non-transitory computer-readable storage medium storing a program for causing a computer to execute a control method for an image pickup system that comprises a first image pickup apparatus and at least one second image pickup apparatus that is communicably connected to the first image pickup apparatus to perform automatic shooting, the control method comprising:
receiving by the first image pickup apparatus a change in shooting parameter set for the first image pickup apparatus;
obtaining by the first image pickup apparatus a first feature value, which is a feature value of a shooting scene in a picked-up image obtained by a first image pickup unit of the first image pickup apparatus using the shooting parameter changed;
notifying by the first image pickup apparatus the at least one second image pickup apparatus of the first feature value and an amount of the change in shooting parameter for the first image pickup apparatus;
upon the at least one second image pickup apparatus receiving a notification of the first feature value and the amount of the change in shooting parameter for the first image pickup apparatus from the first image pickup apparatus, obtaining by the at least one second image pickup apparatus a second feature value, which is a feature value of a shooting scene in a picked-up image obtained by an image pickup unit of the at least one second image pickup apparatus; and
based on a result of comparison between the first feature value and the second feature value and the amount of the change in shooting parameter for the first image pickup apparatus, changing by the at least one second image pickup apparatus a shooting parameter for the at least one second image pickup apparatus.

15. An image pickup apparatus comprising:
an image pickup unit that outputs a picked-up image obtained by capturing an image of a subject;
a communication unit that communicates with another image pickup apparatus;
at least one processor; and
a memory including instructions that, when executed by the at least one processor, causes the at least one processor to:
detect a first feature value of a picked-up image obtained by the image pickup unit;
receive a second feature value of a picked-up image obtained by an image pickup unit of the another image pickup apparatus from the another image pickup apparatus via the communication unit; and
based on the first feature value and the second feature value, change a shooting parameter for the image pickup apparatus.

16. The image pickup apparatus according to claim 15, wherein in changing the shooting parameter for the image pickup apparatus, the instructions cause the at least one processor to change the shooting parameter for the image pickup apparatus so that the first feature value and the second feature value become substantially equal to each other.

17. The image pickup apparatus according to claim 15, wherein in changing the shooting parameter for the image pickup apparatus, the instructions cause the at least one processor to, in a case where an amount of a change in shooting parameter for the another image pickup apparatus is received via the communication unit, change the shooting parameter for the image pickup apparatus based on a result of comparison between the first feature value and the second feature value and the amount of the change in shooting parameter for the another image pickup apparatus.

18. The image pickup apparatus according to claim 15, wherein in changing the shooting parameter for the image pickup apparatus, the instructions cause the at least one processor to, in a case where the second feature value has not been received from the another image pickup apparatus via the communication unit, automatically set the shooting parameter for the image pickup apparatus based on a pickup image obtained by the image pickup unit.

19. The image pickup apparatus according to claim 15, wherein the first feature value and the second feature value are feature values of a same type.

20. The image pickup apparatus according to claim 15, wherein the first feature value and the second feature value are either backlight levels which represent degrees of backlight in picked-up images obtained by the image pickup apparatus and the another image pickup apparatus,
brightness of main subjects in the picked-up images,
magnitudes of subject blur in the picked-up images, or
intensities of noise in the picked-up images; or
either geographical locations of the image pickup apparatus and the another image pickup apparatus,
image pickup directions of the image pickup apparatus and the another image pickup apparatus,
angles of view of the image pickup apparatus and the another image pickup apparatus, or
sizes of main subjects in the picked-up images.

21. A control method for an image pickup apparatus that comprises an image pickup unit that outputs a picked-up image obtained by capturing an image of a subject, and a communication unit that communicates with another image pickup apparatus, the control method comprising:
  detecting a first feature value of a picked-up image obtained by the image pickup unit;
  receiving a second feature value of a picked-up image obtained by an image pickup unit of the another image pickup apparatus from the another image pickup apparatus via the communication unit; and
  based on the first feature value and the second feature value, changing a shooting parameter for the image pickup apparatus.

22. A non-transitory computer-readable storage medium storing a program for causing a computer to execute a control method for an image pickup apparatus that comprises an image pickup unit that outputs a picked-up image obtained by capturing an image of a subject, and a communication unit that communicates with another image pickup apparatus, the control method comprising:
  detecting a first feature value of a picked-up image obtained by the image pickup unit;
  receiving a second feature value of a picked-up image obtained by an image pickup unit of the another image pickup apparatus from the another image pickup apparatus via the communication unit; and
  based on the first feature value and the second feature value, changing a shooting parameter for the image pickup apparatus.

* * * * *